United States Patent
Zhang

(10) Patent No.: US 7,912,129 B2
(45) Date of Patent: Mar. 22, 2011

(54) UNI-MODAL BASED FAST HALF-PEL AND FAST QUARTER-PEL REFINEMENT FOR VIDEO ENCODING

(75) Inventor: Ximin Zhang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1406 days.

(21) Appl. No.: 11/378,148

(22) Filed: Mar. 16, 2006

(65) Prior Publication Data

US 2007/0217516 A1 Sep. 20, 2007

(51) Int. Cl.
*H04B 1/66* (2006.01)
(52) U.S. Cl. ......... 375/240.17; 375/240.16; 375/240.12; 375/240.01; 375/240
(58) Field of Classification Search .......... 375/240, 375/240.16, 240.17, 240.01, 240.12
See application file for complete search history.

(56) References Cited

U.S. PATENT DOCUMENTS

| | | | |
|---|---|---|---|
| 5,699,118 A | 12/1997 | Bolton | 348/405 |
| 6,272,253 B1 | 8/2001 | Bannon et al. | 382/236 |
| 6,614,847 B1 | 9/2003 | Das et al. | 375/240.16 |
| 6,859,559 B2 | 2/2005 | Boon et al. | 382/238 |
| 6,882,685 B2 | 4/2005 | Malvar | 375/240.03 |
| 6,990,506 B2 | 1/2006 | Sun | 708/402 |
| 7,782,951 B2 * | 8/2010 | Muthukrishnan et al. | 375/240.16 |
| 2003/0118117 A1 | 6/2003 | McVeigh et al. | |
| 2005/0013367 A1 | 1/2005 | Gallant et al. | 375/240.16 |
| 2005/0069211 A1 | 3/2005 | Lee et al. | 382/239 |
| 2005/0074059 A1 * | 4/2005 | De Bruijn et al. | 375/240 |
| 2005/0129116 A1 | 6/2005 | Jeon | |
| 2005/0207495 A1 | 9/2005 | Ramasastry et al. | 375/240.16 |
| 2005/0243933 A1 * | 11/2005 | Landsiedel et al. | 375/240.16 |
| 2005/0265454 A1 | 12/2005 | Muthukrishnan et al. | 375/240.16 |
| 2005/0276330 A1 | 12/2005 | Park et al. | 375/240.17 |
| 2006/0098738 A1 | 5/2006 | Cosman et al. | |
| 2006/0188022 A1 * | 8/2006 | Lee et al. | 375/240.17 |
| 2006/0280248 A1 * | 12/2006 | Kim et al. | 375/240.16 |
| 2008/0043831 A1 * | 2/2008 | Sethuraman et al. | 375/240 |
| 2008/0205505 A1 * | 8/2008 | Monro | 375/240 |

OTHER PUBLICATIONS

Ralf Schäfer et al., "The emerging H.264/AVC", EBU Technical Review, Jan. 2003, and pp. 1-12.
"Transform and quantization", H.264/MPEG-4 Part 10: Transform & Quantization, Mar. 19, 2003, and pp. 1-9.
Gary J. Sullivan et. al., "The H.264/AVC Advance Video Doding Standard: Overview and Introduction to the Fidelity Range Extensions", Aug. 2004, and pp. 1-21.

(Continued)

*Primary Examiner* — Eva Y Puente
(74) *Attorney, Agent, or Firm* — Haverstock & Owens LLP

(57) ABSTRACT

A method of half-pixel interpolation and quarter-pixel interpolation are adapted for reducing the impact of aliasing within motion estimation. To estimate a motion vector with quarter-pixel accuracy more efficiently, the improved method is able to skip checking certain points using the uni-modal assumption. In an embodiment, a diamond based refinement is implemented. Within the diamond based refinement are half-pel refinement and quarter-pel refinements. Furthermore, within the half-pel refinement are methods for on-the-fly interpolation and pre-computed interpolation. Within quarter-pel refinement, the method depends on whether four neighbor half-pel points are checked or just one or two half-pel points. Moreover, within each of the different embodiments is the ability to focus on quality or speed wherein different methods are implemented to maximize the desired function. In another embodiment, a square based refinement is implemented.

38 Claims, 11 Drawing Sheets

OTHER PUBLICATIONS

Yeping Su et al. "Efficient MPEG-2 to H.264/AVC Intra Transcoding in Transform-domain", Mitsubishi Electric Research Laboratories, http://www.merl.com, Dec. 2005, and 4 pages.

Jun Xin et al., "Efficient Macroblock Coding-Mode Decision for H.264/AVC Video Coding", Mitsubishi Electric Research Laboratories, and 6 pgs.

Keng-Pang Lim et al., "Text Description of Joint Model Reference Encoding Methods and Decoding Concealment Methods", Document: JVT-N046, Jan. 2005, and pp. i-iv thru 1-39.

Libo Yang et al., "Prediction-Based Directional Fractional Pixel Motion Estimation for H.264 Video Coding", Microsoft Research Asia, 2005, and pp. 901-904.

Technical Report, "Part 7: Optimized Reference Software for Coding of Audio-Visual Objects", ISO/IEC TR 14496-7, 2004, and pp. i-vi thru 1-32.

Zhibo Chen et al., "Fast Integer Pel and Fractional Pel Motion Estimation for JVT", Document: JVT-F017, Dec. 2002, and pp. 1-13.

K. P. Lim et al., "Fast INTER Mode Selection", Document: JVT-1020, Sep. 2003, and pp. 1-11.

Gary Sullivan et al., "Joint Model Reference Encoding Methods and Decoding Concealment Methods", Document: JVT-1049, Sep. 2003, and pp. i-iv thru 1-35.

Gary Sullivan et al., "Draft of Version 4 of H.264/AVC (ITU-T Recommendation H.264 and ISO/IEC 14496-10 (MPEG-4 part 10) Advanced Video Coding)", Document: JVT-M050d0, Oct. 2004, and pp. i-xvi thru 1-315.

Peng Yin et al., "Fast Mode Decision and Motion Estimation for JVT/H.264", 2003, and 4 pages.

Gary Sullivan et al., "Draft of Version 4 of H.264/AVC (ITU-T Recommendation H.264 and ISO/IEC 14496-10 (MPEG-4 part 10) Advanced Video Coding)", Document: JVT-N050d1, Jan. 2005, and pp. i-xvi thru 1-315.

Kannan Ramchandran et al., "Bit Allocation for Dependent Quantization with Applications to Multiresolution and MPEG Video Coders", IEEE Transactions on Image Processing, Vo. 3, No. 5, Sep. 1994, and pp. 533-545.

Liang-Jin Lin et al., "Bit-Rate Control Using Piecewise Approximated Rate-Distortion Characteristics", IEEE Transactions on Circuits and Systems for Video Technology, vol. 8, No. 4, Aug. 1998, and pp. 446-459.

Huifang Sun et al., "MPEG Coding Performance Improvement by Jointly Optimizing Coding Mode Decisions and Rate Control", IEEE Transactions on Circuits and Systems for Video Technology, vol. 7, No. 3, Jun. 1997, and pp. 449-458.

Shan Liu et al. "Joint Temporal-Spatial Bit Allocation for Video Coding with Dependency", IEEE Transactions on Circuits and Systems for Video Technology, vol. 15, No. 1, Jan. 2005, and pp. 15-26.

Thomas Wiegand et al., "Long-Term Memory Motion-Compensated Prediction", IEEE Transactions on Circuits and Systems for Video Technology, vol. 9, No. 1, Feb. 1999, and pp. 70-84.

Athanasios Leontaris et a., "Video Compression for Lossy Packet Networks with Mode Switching and a Dual-Frame Buffer", IEEE Transactions on Image Processing, vol. 13, No. 7, Jul. 2004, and pp. 885-897.

* cited by examiner

High Quality Version        Super Fast Version

High Quality Version        Super Fast Version

High Quality Version

Super Fast Version

High Quality Version

Super Fast Version

|  1  |  2  |  3  |
|---|---|---|
| ▨ | ▨ | ☐ |

|  4  |  0  |  5  |
|---|---|---|
| ▨ | ■ | ■ |

|  6  |  7  |  8  |
|---|---|---|
| ☐ | ☐ | ☐ |

▨ Always checked

■ Checked with high priority

☐ Checked with low priority

Fig. 8

UNI-MODAL BASED FAST HALF-PEL AND FAST QUARTER-PEL REFINEMENT FOR VIDEO ENCODING

FIELD OF THE INVENTION

The present invention relates to the field of video compression. More specifically, the present invention relates to improved motion estimation in digital video encoders.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bit-stream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codes use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

One of the most time-consuming components within the encoding process is motion estimation. Motion estimation is utilized to reduce the bit rate of video signals by implementing motion compensated prediction in combination with transform coding of the prediction error. Motion estimation-related aliasing is not able to be avoided by using inter-pixel motion estimation, and the aliasing deteriorates the prediction efficiency. In order to solve the deterioration problem, half-pixel interpolation and quarter-pixel interpolation are adapted for reducing the impact of aliasing. To estimate a motion vector with quarter-pixel accuracy, a three step search is generally used. In the first step, motion estimation is applied within a specified search range to each integer pixel to find the best match. Then, in the second step, eight half-pixel points around the selected integer-pixel motion vector are examined to find the best half-pixel matching point. Finally, in the third step, eight quarter-pixel points around the selected half-pixel motion vector are examined, and the best matching point is selected as the final motion vector. Considering the complexity of the motion estimation, the integer-pixel motion estimation takes a major portion of motion estimation if a full-search is used for integer-pixel motion estimation. However, if a fast integer motion estimation algorithm is utilized, an integer-pixel motion vector is able to be found by examining less than ten search points. As a consequence, the computation complexity of searching the half-pixel motion vector and quarter-pixel motion vector becomes dominant.

SUMMARY OF THE INVENTION

A method of half-pixel interpolation and quarter-pixel interpolation are adapted for reducing the impact of aliasing within motion estimation. To estimate a motion vector with quarter-pixel accuracy more efficiently, the improved method is able to skip checking certain points using the uni-modal assumption. In an embodiment, a diamond based refinement is implemented. Within the diamond based refinement are half-pel refinement and quarter-pel refinements. Furthermore, within the half-pel refinement are on-the-fly interpolation and pre-computed interpolation. Within quarter-pel refinement, the method depends on whether four neighbor half-pel points are checked or just one or two half-pel points. Moreover, within each of the different embodiments is the ability to focus on quality or speed wherein different methods are implemented to maximize the desired function. In another embodiment, a square based refinement is implemented.

In one aspect, a method of motion estimation in a video encoder, comprises utilizing sub-pel diamond refinement and applying uni-modal assumptions to determine which sub-pel points are checked within the sub-pel diamond refinement. On-the-fly interpolation is implemented. The method further comprises checking two corner half-pel points between a best integer point and a second best integer point and checking four neighbor points around a selected point. Alternatively, the method further comprises checking one corner half-pel point between a second best integer point and a third best integer point and checking four neighbor points around a selected point. Alternatively, pre-computed interpolation is implemented. The method further comprises checking two corner half-pel points between a best integer point and a second best integer point and checking two neighbor points between the best integer point and the better corner half-pel point. Alternatively, the method further comprises checking one corner half-pel point between a second best integer point and a third best integer point and checking a neighbor between a best integer point and the second best integer point. The video encoder utilizes H.264 standard protocol. The sub-pel refinement is half-pel refinement. Alternatively, the sub-pel refinement is quarter-pel refinement. The method further comprises checking two corner quarter-pel points between a best half-pel refinement point and a second best half-pel refinement point and checking two neighbor quarter-pel points between the best half-pel refinement point and the better corner quarter-pel point, where four neighbor half-pel points are checked. Alternatively, the method further comprises checking one corner quarter-pel point between a second best half-pel refinement point and a third best half-pel refinement point and checking a neighbor quarter-pel point between the best half-pel refinement point and the second best half-pel refinement point, where four neighbor half-pel points are checked. Alternatively, the method further comprises checking two corner quarter-pel points between a best half-pel refinement point and a second best half-pel refinement point, wherein if either of the two corner quarter-pel points obtains a better match than the best half-pel go to next step, otherwise checking a corner point far from the best integer point when the best integer point is not the best point after half-pel refinement and checking a neighbor quarter-pel point neighboring the best quarter-pel corner point and the best point after half-pel refinement, where one or two neighbor half-pel points are checked. Alternatively, the method further comprises checking one corner quarter-pel point between a second best integer point and the checked corner half-pel point and checking a neighbor quarter-pel point neighboring the best quarter-pel corner point and the best point after half-pel refinement, where one or two neighbor half-pel points are checked.

In another aspect, a method of sub-pel refinement for motion estimation in a video encoder, comprises determining a best integer point, checking one or more corner points around the best integer point, selecting a first point from the one or more corner points with the smallest prediction cost, checking one or more neighbor points around the selected first point and selecting a second point with the smallest prediction cost of the one or more neighbor points. On-the-fly interpolation is implemented. Checking one or more corner points comprises checking two corner half-pel points between a best integer point and a second best integer point. Checking one or more neighbor points comprises checking four neighbor points around the selected first point. Alternatively, checking one or more corner points comprises checking one corner half-pel point between a second best integer point and a third best integer point. Alternatively, checking one or more neighbor points comprises checking four neighbor points around the selected first point. Alternatively, pre-computed interpolation is implemented. Checking one or more corner points comprises checking two corner half-pel points between a best integer point and a second best integer point. Checking one or more neighbor points comprises checking two neighbor points between the best integer point and the better corner half-pel point. Alternatively, checking one or more corner points comprises checking one corner half-pel point between a second best integer point and a third best integer point. Alternatively, checking one or more neighbor points comprises checking a neighbor between the best integer point and the second best integer point. The method is selected from the group consisting of diamond search based and square search based. The sub-pel refinement is half-pel refinement. Alternatively, the sub-pel refinement is quarter-pel refinement. Checking one or more corner points comprises checking two corner quarter-pel points between a best half-pel refinement point and a second best half-pel refinement point. Checking one or more neighbor points comprises checking two neighbor quarter-pel points between the best half-pel refinement point and the better corner quarter-pel point, where four neighbor half-pel points are checked. Alternatively, checking one or more corner points comprises checking one corner quarter-pel point between a second best half-pel refinement point and a third best half-pel refinement point. Alternatively, checking one or more neighbor points comprises checking a neighbor quarter-pel point between the best half-pel refinement point and the second best half-pel refinement point, where four neighbor half-pel points are checked. Alternatively, checking one or more corner points comprises checking two corner quarter-pel points between a best half-pel refinement point and a second best half-pel refinement point, wherein if either of the two corner quarter-pel points obtains a better match than the best half-pel, checking one or more neighbor points comprises checking a neighbor quarter-pel point neighboring the best quarter-pel corner point and the best point after half-pel refinement, where one or two neighbor half-pel points are checked, otherwise checking a corner point far from the best integer point when the best integer point is not the best point after half-pel refinement. Alternatively, checking one or more corner points comprises checking one corner quarter-pel point between a second best integer point and the checked corner half-pel point. Alternatively, checking one or more neighbor points comprises checking a neighbor quarter-pel point neighboring the best quarter-pel corner point and the best point after half-pel refinement, where one or two neighbor half-pel points are checked. The selected second point is utilized to determine a motion vector.

In another embodiment, an apparatus comprises a program module for utilizing sub-pel diamond refinement and applying uni-modal assumptions to determine which sub-pel points are checked within the sub-pel diamond refinement and a processor for executing the program module.

In yet another embodiment, an apparatus comprises a program module for checking one or more corner points around a best integer point, selecting a first point from the one or more corner points with the smallest prediction cost, checking one or more neighbor points around the selected first point and selecting a second point with the smallest prediction cost of the one or more neighbor points and a processor for executing the program module.

In another embodiment, a video encoder, comprises a component for motion estimation, wherein the component for motion estimation avoids computations utilizing uni-modal assumptions and an entropy coder coupled to the component for motion estimation, wherein the entropy coder produces a plurality of compressed video bits. The video encoder utilizes H.264 standard protocol.

In yet another embodiment, a video capture and display device, comprises a receiving unit for receiving video data, a display unit coupled to the receiving unit for displaying video data and a video encoder coupled to the receiving unit and the display unit for producing one or more compressed video bits, wherein the video encoder avoids computations utilizing uni-modal assumptions. The video encoder utilizes H.264 standard protocol.

BRIEF DESCRIPTION OF THE DRAWINGS

FIG. 8 illustrates a fast square point refinement.

DETAILED DESCRIPTION OF THE PREFERRED EMBODIMENT

Figure 1:
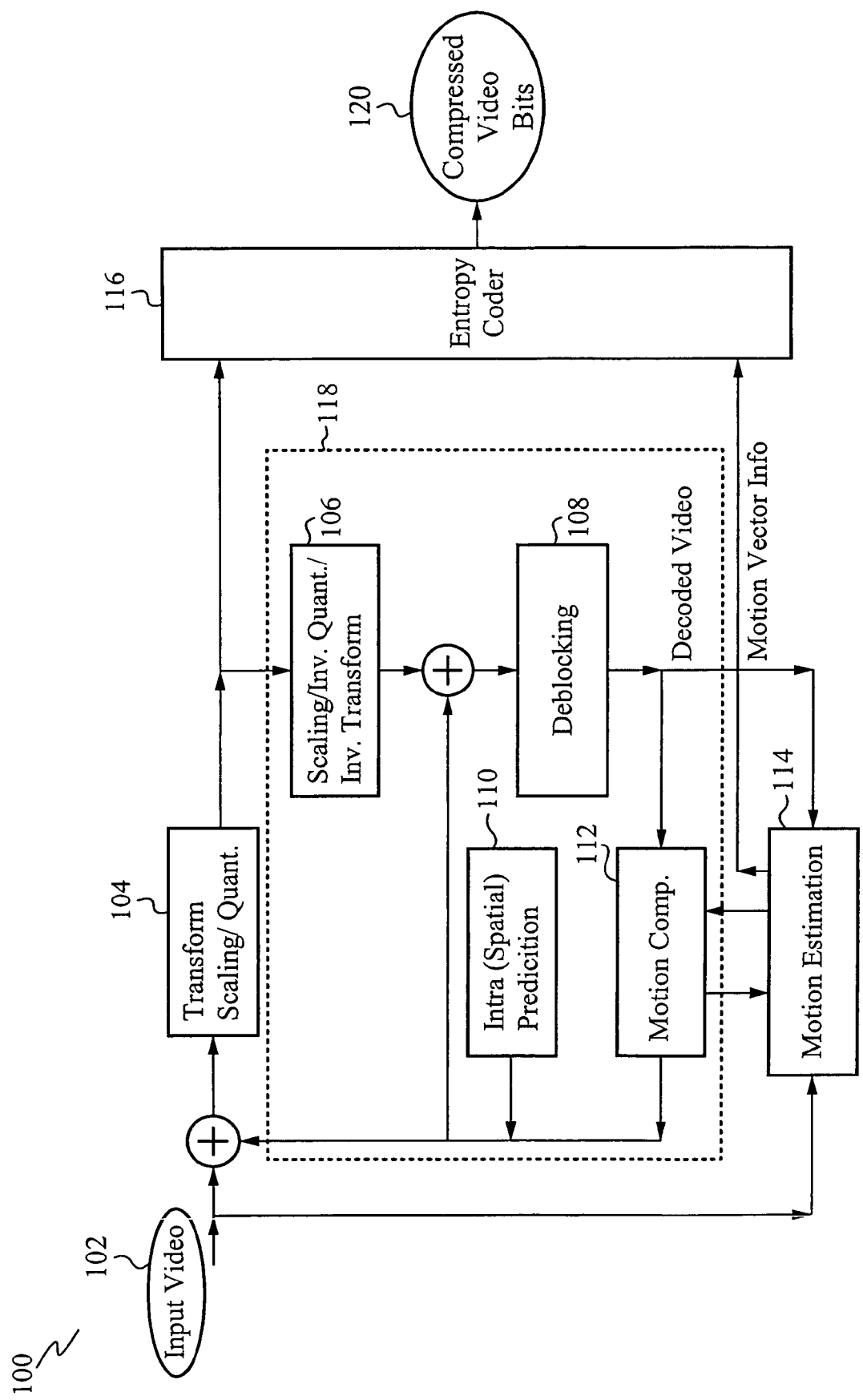
FIG. 1 illustrates a block diagram of the video coding layer of a macroblock.

FIG. 1 shows a block diagram of the video coding layer 100 of a macroblock. The video coding layer 100 (e.g. the encoder) includes a combination of temporal and spatial predictions along with transform coding. An input video 102 is received and split into a plurality of blocks. The first picture of a sequence is usually "intra" coded using only information contained within itself. Each part of a block in an intra frame is then predicted at the intra prediction module 110 using spatially neighboring samples of previously coded blocks. The encoding process chooses which neighboring samples are utilized for intra prediction and how they are used. This process is conducted at the local decoder 118 as well as at the encoder 100. For the rest of the pictures of a sequence, usually "inter" coding is used. Inter coding implements motion compensation 112 from other previously decoded pictures. The encoding process for inter prediction/motion estimation at the motion estimation module 114 includes choosing motion data, determining the reference picture and a spatial displacement that is applied to all samples of the block. The motion data is transmitted as side information which is used by the encoder 100 and local decoder 118.

The difference between the original and the predicted block is referred to as the residual of the prediction. The residual is transformed, and the transform coefficients are scaled and quantized at the transform and scaling quantization module 104. For the quantization of transform coefficients, scalar quantization is utilized. Each block is transformed using an integer transform, and the transform coefficients are quantized and transmitted using entropy-coding methods. An entropy encoder 116 uses a codeword set for all elements except the quantized transform coefficients. For the quantized transform coefficients, Context Adaptive Variable Length Coding (CAVLC) or Context Adaptive Binary Arithmetic Coding (CABAC) is utilized. The deblocking filter 108 is implemented to control the strength of the filtering to reduce the blockiness of the image.

The encoder 100 also contains the local decoder 118 to generate prediction reference for the next blocks. The quantized transform coefficients are inverse scaled and inverse transformed 106 in the same way as the encoder side which gives a decoded prediction residual. The decoded prediction residual is added to the prediction, and the combination is directed to the deblocking filter 108 which provides decoded video as output. Ultimately, the entropy coder 116 produces compressed video bits 120 of the originally input video 102.

The method of sub-pel refinement described herein is based on the assumption that the prediction error surface is uni-modal near the integer-pel motion vector. By using the method, six to twelve sub-pixel points are able to be skipped depending on the situation. Hence, only four to ten points need to be checked instead of the sixteen described above. Therefore, the sub-pixel prediction complexity is significantly reduced.

Figure 2:
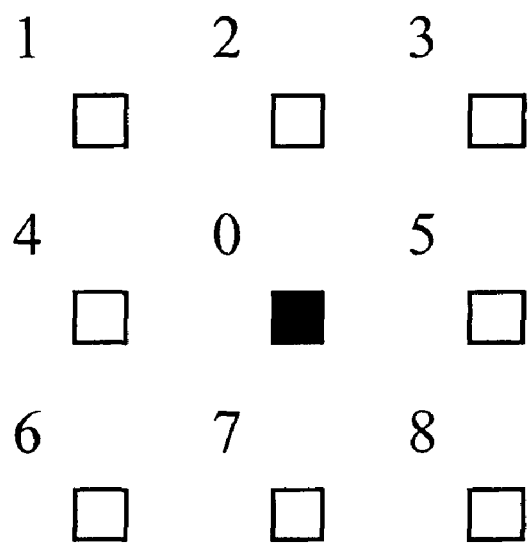
FIG. 2 illustrates a graphical representation of eight half-pixel points around a best matching integer-pixel.

Sub-pixel motion estimation is applied around a best matching integer-pixel. If the integer-pixel motion estimation is accurate, the area around the best matching integer pixel is the area near the global minimum. Although the whole error surface is not necessarily uni-modal, it is reasonable to assume that the small area around the global minimum is. For the uni-modal surface, there are characteristics that are able to be used to reduce the complexity of sub-pixel motion estimation. In FIG. 2, eight half-pixel points (1, 2, 3, 4, 5, 6, 7, 8) are shown around the best matching integer-pixel 0. Assuming the area near the best matching integer-pixel is uni-modal, a number of facts exist, where E denotes the prediction error and P denotes the probability.

Fact 1:
If $E(2)>E(0)$ and $E(4)>E(0)$, $E(1)>=E(0)$; if $E(2)>E(0)$ and $E(5)>E(0)$, $E(3)>=E(0)$; if $E(7)>E(0)$ and $E(5)>E(0)$, $E(8)>=E(0)$; if $E(7)>E(0)$ and $E(4)>E(0)$, $E(6)>=E(0)$.

Fact 2:
If $E(2)<E(0)$ and $E(4)<E(0)$, $E(1)<=E(0)$; if $E(2)<E(0)$ and $E(5)<E(0)$, $E(3)<=E(0)$; if $E(7)<E(0)$ and $E(5)<E(0)$, $E(8)<=E(0)$; if $E(7)<E(0)$ and $E(4)<E(0)$, $E(6)<=E(0)$.

Fact 3:
If $E(2)>E(1)$, $E(3)>=E(2)$; if $E(0)>E(4)$, $E(5)>=E(0)$; if $E(7)>E(6)$, $E(8)>=E(7)$; if $E(4)>E(1)$, $E(6)>=E(4)$; if $E(0)>E(2)$, $E(7)>=E(0)$; if $E(5)>E(3)$, $E(8)>=E(5)$ Fact 4:
If $E(2)>E(3)$, $E(1)>=E(2)$; if $E(0)>E(5)$, $E(4)>=E(0)$; if $E(7)>E(8)$, $E(6)>=E(7)$; if $E(4)>E(6)$, $E(1)>=E(4)$; if $E(0)>E(7)$, $E(2)>=E(0)$; if $E(5)>E(8)$, $E(3)>=E(5)$ Fact 5:
If $E(5)>E(4)$, $P(E(3)>E(1))>P(E(3)<E(1))$ and $P(E(8)>E(6))>P(E(8)<E(6))$; If $E(7)>E(2)$, $P(E(8)>E(3))>P(E(8)<E(3))$ and $P(E(6)>E(1))>P(E(6)<E(1))$.

Fact 6:
If $E(5)<E(4)$, $P(E(3)>E(1))<P(E(3)<E(1))$ and $P(E(8)>E(6))<P(E(8)<E(6))$; If $E(7)<E(2)$, $P(E(8)>E(3))<P(E(8)<E(3))$ and $P(E(6)>E(1))<P(E(6)<E(1))$.

Figure 3A:
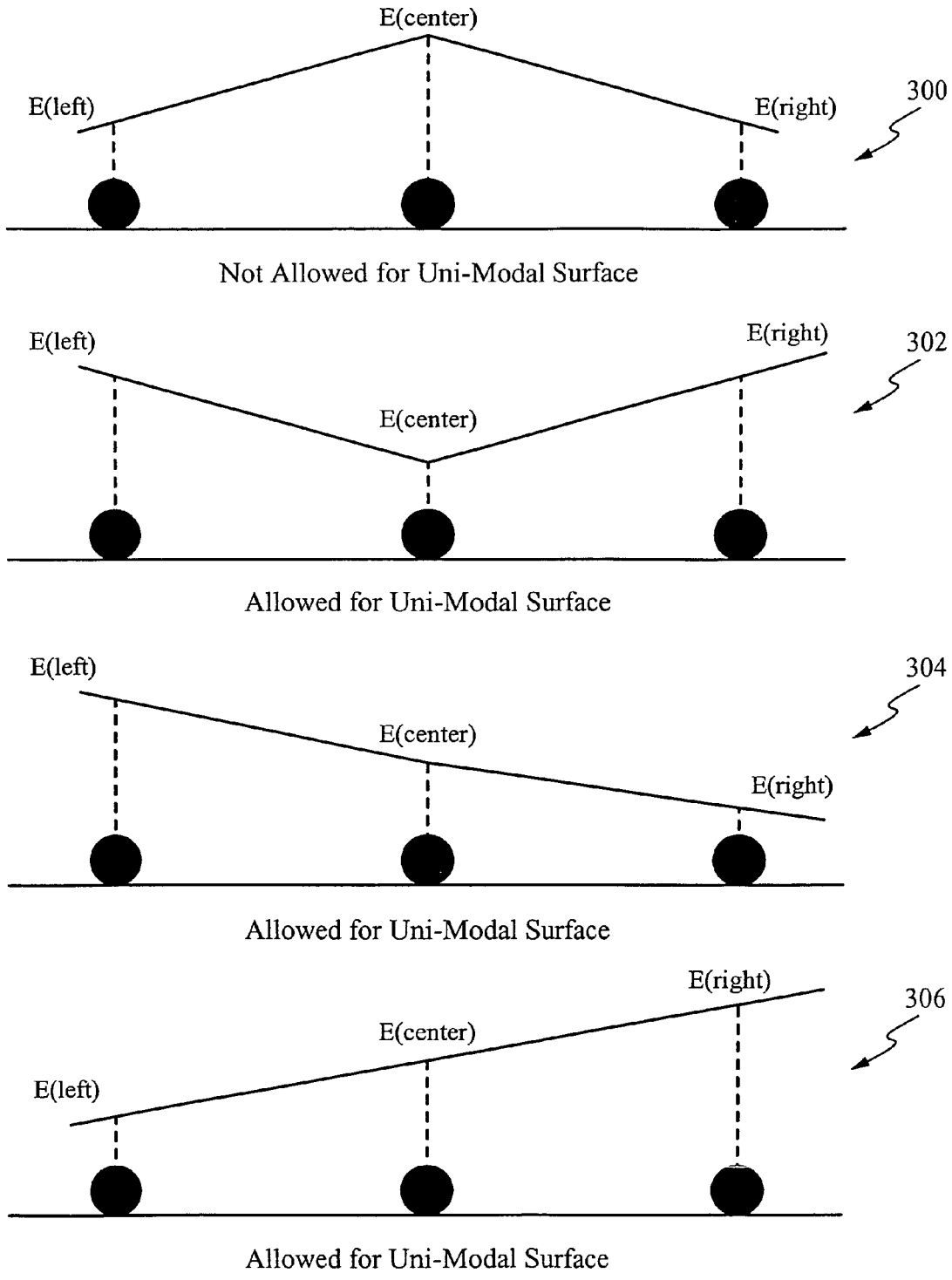
FIG. 3A illustrates graphical representations of facts for a uni-modal surface.
Figure 3B:
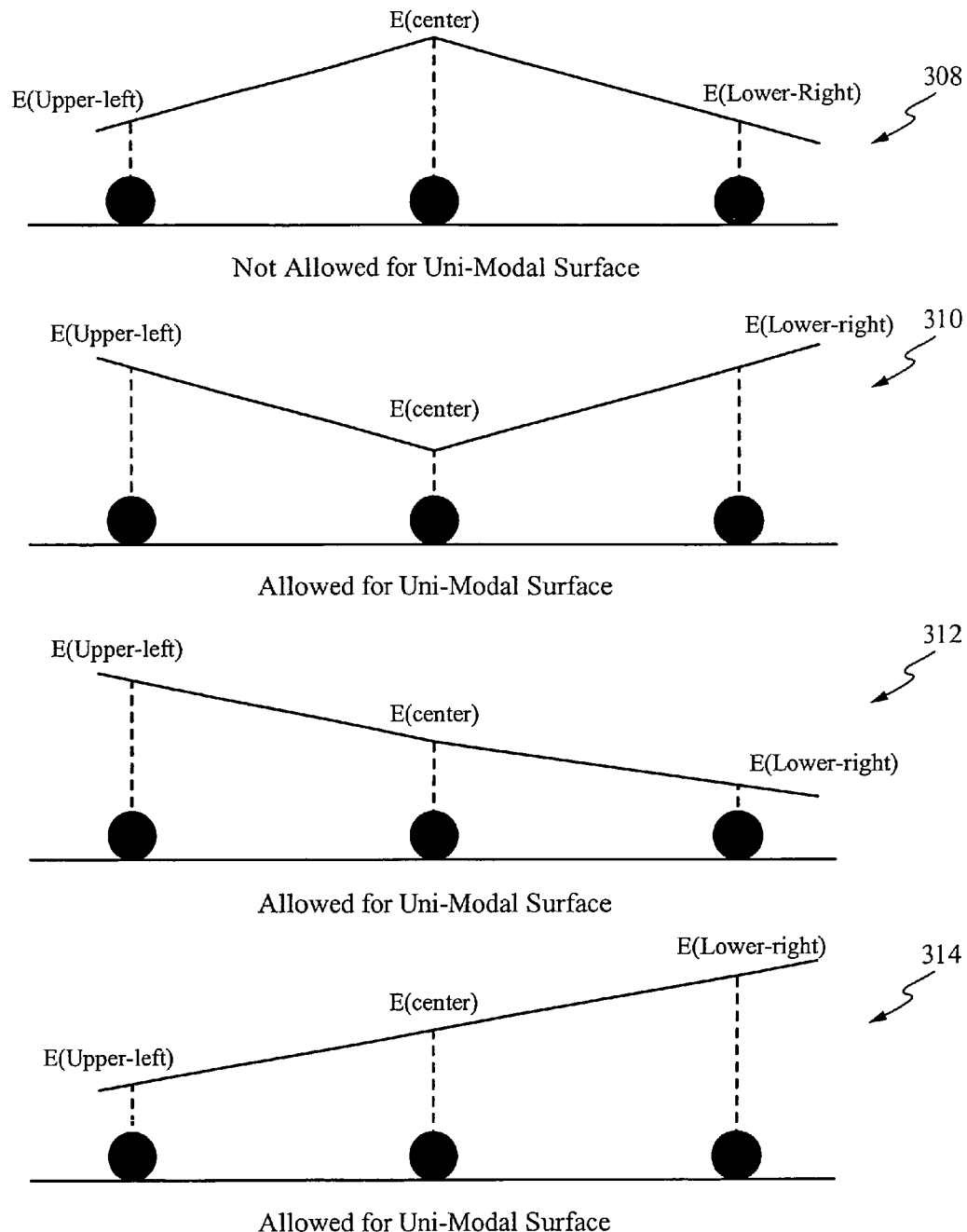
FIG. 3B illustrates graphical representations of facts for a uni-modal surface.

Fact 7:
If $E(2)>E(0)$, $P(E(1)>E(4))>P(E(1)<E(4))$ and $P(E(3)>E(5))>P(E(3)<E(5))$; if $E(5)>E(0)$, $P(E(3)>E(2))>P(E(3)<E(2))$ and $P(E(8)>E(7))>P(E(8)<E(7))$; if $E(7)>E(0)$, $P(E(6)>E(4))>P(E(6)<E(4))$ and $P(E(8)>E(5))>P(E(8)<E(5))$; if $E(4)>E(0)$, $P(E(6)>E(7))>P(E(6)<E(7))$ and $P(E(1)>E(2))>P(E(1)<E(2))$;

FIGS. 3A and 3B illustrate graphical representations of facts for a uni-modal surface. In FIG. 3A, representation 300 shows that it is not allowed for both the left and right side to be less than the center in a uni-modal surface. Such a situation would create multiple minimums which are not possible for a uni-modal surface. However, representations 302, 304 and 306 in FIG. 3A, show examples of permitted uni-modal surfaces where the minimum is at the center in 302, at the right in 304 or at the left in 306. In FIG. 3B, representation 308 shows that it is not allowed for both the upper-left and lower-right side to be less than the center in a uni-modal surface. Again, such a situation would create multiple minimums which are not possible for a uni-modal surface. Representations 310, 312 and 314 of FIG. 3B, show examples of permitted uni-modal surfaces where the minimum is at the center in 310, at the lower-right in 312 or at the upper-left in 314.

Based on the above facts, some points are able to be skipped during the sub-pixel point examination depending on the conditions of the checked points. Thus, a uni-modal based fast sub-pel motion estimation method is described below. Essentially, if one side is less than the center, it is able to be assumed that the other side is not less than the center; otherwise the situations of 300 and 308 occur which are not permitted.

There are two schemes to conduct eight point half-pel refinement and eight point quarter-pel refinement. The first scheme is a diamond search based on eight point refinement. The second scheme is a square eight point refinement. Diamond based refinement has the potential to reuse the half-pel interpolation result and has a big search range, hence it has some advantages over square based refinement.

The fast diamond half-pel refinement includes two steps. Given the best integer point, four corner points (upper left, upper right, lower right and lower left) are checked in the first step. The point with the best match, or the smallest prediction cost, is selected. Then, four neighbor points around the selected point are checked. The point with the best match is selected as the best half-pel refinement.

There are two methods of generating the half-pel by integer-pel interpolation. One embodiment is referred to as on-the-fly interpolation which generally saves memory but causes a moderate increase in interpolation computation. Another embodiment is referred to as pre-computed interpolation which saves computation complexity but requires a significant amount of memory.

For on-the-fly interpolation, the following steps are implemented. The first step depends on what the priority is. If quality is a main priority, two corner half-pel points are checked between the best integer point and the second best integer point. If complexity reduction is a prime priority, only one corner half-pel point is checked between the second best integer point and the third best integer point. Then in the second step, all four neighbor points around the selected point, or the best match, are checked to reuse the interpolation result for quarter-pel refinement.

Figure 4:
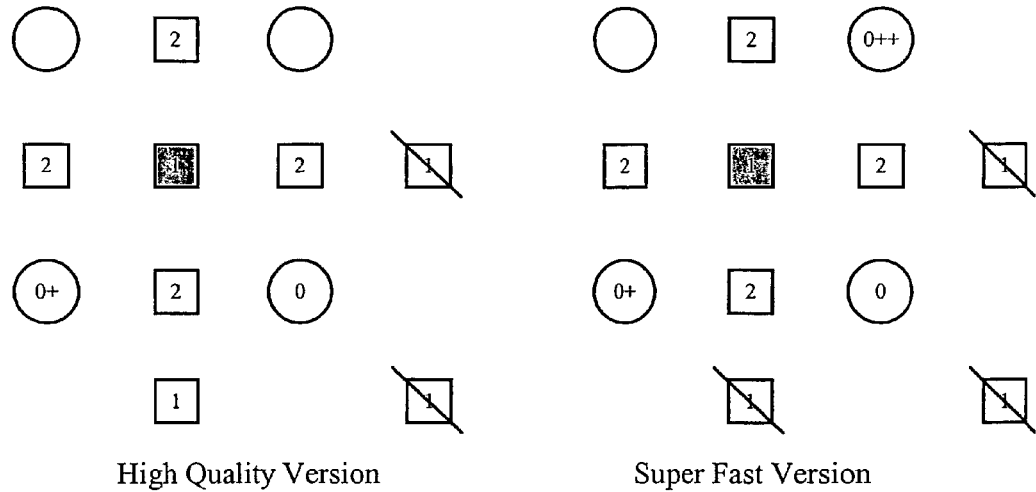
FIG. 4 illustrates algorithm examples for the on-the-fly interpolation scheme.

FIG. 4 illustrates half-pel motion estimation examples for the on-the-fly interpolation scheme; both a high quality version and a super fast version. In the figure, 0 denotes the best integer point; 0+ denotes the second best integer point and 0++ denotes the third best integer point. The shaded point denotes the best refinement point in the first step. In the high quality version, the upper right half-pel point and the lower right half-pel point are both skipped because under the unimodal theory, the desired half-pel point is between the best integer point and the second best integer point. In the super fast version, since only the corner half-pel point between the second best integer point and the third best integer point is checked, the other three corner half-pel points are skipped. At least two check points are saved by implementing this method.

For on-the-fly interpolation, it is assumed that the information of surrounding integer points is known in the first step. If that information is unknown, the corner points are checked one by one. If one corner point obtains a better match than point 0, the corner point in the opposite direction is skipped. For instance, if the upper left point obtains better match than point 0, the lower right point is skipped.

For pre-computed interpolation, the following steps are implemented. If quality is the highest priority, two corner half-pel points are checked between the best integer point and the second best integer point. If complexity reduction is the main priority, only one corner half-pel point is checked between the second best integer point and the third best integer point. Then, two neighbor points are checked between the best integer point and the better corner point if quality is the main priority. The only neighboring point between the best integer point and the second best integer point is checked if complexity reduction is the highest priority.

Figure 5:
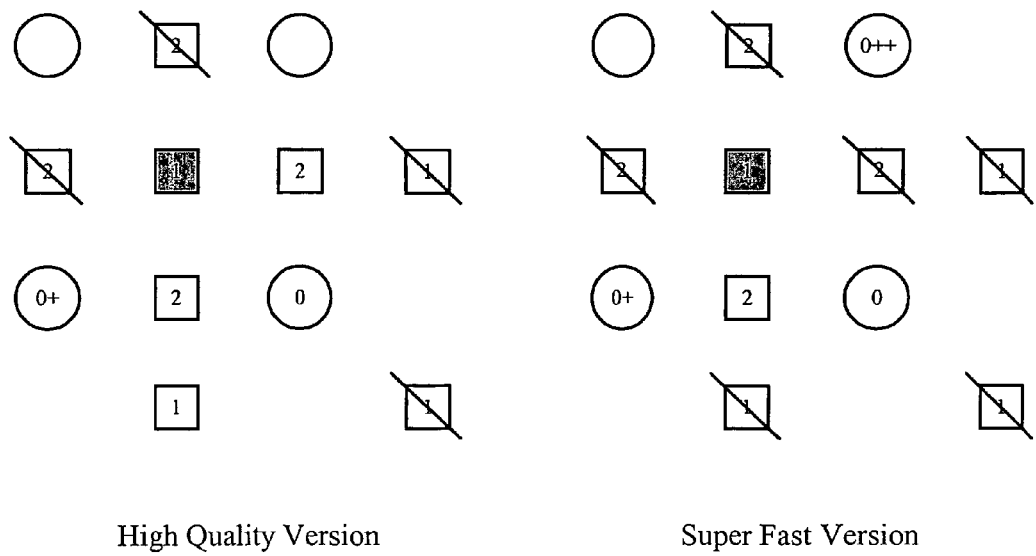
FIG. 5 illustrates algorithm examples for the pre-computed interpolation scheme.

FIG. 5 illustrates embodiment examples for pre-computed interpolation. Similar to FIG. 4, 0 denotes the best integer point, 0+ denotes the second best integer point and 0++ denotes the third best integer point. The shaded point denotes the best refinement point in the first step. In the high quality version, the corner half-pel points between the best integer point and the second best integer point are checked. Also, the neighbor points between the best integer point and the better corner point are checked. The other points are able to be skipped. In the super fast version, only one corner half-pel point is checked between the second best integer and the third best integer point. Also, the only neighbor point between the best integer point and the second best integer point is checked. Thus, the other points are able to be skipped. At least four check points are saved by implementing this method. If the surrounding integer conditions are unknown, then the same strategy as described for the method of on-the-fly interpolation replaces the first step.

Similar to half-pel search, the quarter-pel refinement includes two steps. In the first step, the point with the best match, or the smallest prediction cost, from the first step of the half-pel refinement is the center. It is either the best integer point or a half-pel corner point. Quarter-pel is generated from interpolation of half-pel. The half-pel interpolation result is able to be used by quarter-pel refinement. After the first step, one or more neighbor quarter-pel points around the selected point are checked in order to reuse the half-pel interpolation result. The point with the best match is selected as the best sub-pel refinement. Corresponding to whether four neighbor half-pel points or less are checked in the half-pel search, two fast quarter-pel search methods are available.

When all four neighbor half-pel points are checked, the method includes the following steps. If quality is the main priority, two corner quarter-pel points are checked between the best half-pel refinement point and the second best half-pel refinement point. If complexity reduction is the highest priority, only one corner quarter-pel point is checked between the second best half-pel refinement point and the third best half-pel refinement point. Then, two neighbor quarter-pel points are checked between the best half-pel refinement point and the better corner point if quality is the main priority. Only the neighbor quarter-pel point between the best half-pel refinement point and the second best half-pel refinement point is checked if complexity is the highest priority.

Figure 6:
FIG. 6 illustrates algorithm examples for the quarter-pel motion estimation scheme.
Figure 6:
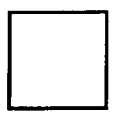

FIG. 6 illustrates examples for quarter-pel motion estimation. In the figure, 1 denotes the selected half-pel refinement center, 2+ denotes the best half-pel point and 2++ denotes the second best half-pel point among the four neighbor points. The shaded point denotes the better refinement point in the first step. Assuming that point 2+ provides a better match than point 1, the second step is conducted between point 2+ and the shaded point 3.

When only one or two neighbor half-pel points are checked, the method includes the following steps. If quality is the highest priority, two corner quarter-pel points are checked between the best half-pel refinement point and the second best half-pel refinement point. If either of the two corner quarter-pel points obtains better match than the best half-pel point, then the step is halted and jumps to the second step; but if not, the corner point far from the best integer point is checked when the integer point 0 is not the best point after the half-pel refinement. If complexity reduction is the main priority, only one corner quarter-pel point is checked between the best integer point and the checked corner half-pel point. Then, in the second step, only the neighbor quarter-pel point to the best quarter-pel corner point and the best point after half-pel refinement is checked.

Figure 7:
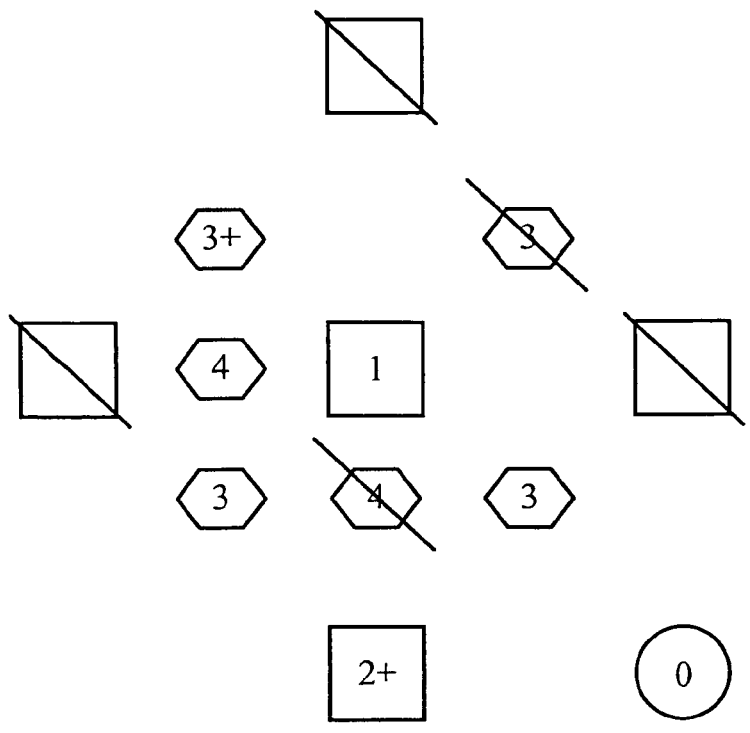
FIG. 7 illustrates algorithm examples for the quarter-pel motion estimation scheme.
Figure 7:
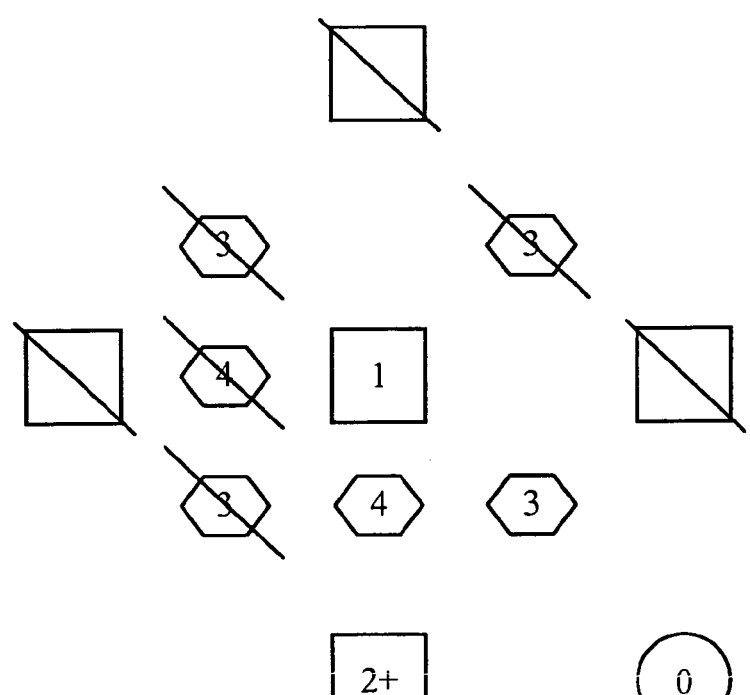

FIG. 7 illustrates examples for quarter-pel motion estimation. In the figure, 0 denotes the best integer point, 1 denotes the selected best half-pel refinement point, 2+ denotes the other half-pel point, 3+ denotes the best quarter-pel corner point in the high quality version and 4 denotes the only neighbor quarter-pel points to be checked. Using the method described above, at least four check points are saved.

FIG. 8 illustrates a fast square point refinement. The figure shows which points are checked always, with high priority and with low priority based on the rules described herein. If all of the surrounding information is unknown before the refinement, the fast sub-pel square 8 point refinement method is able to be described by using the notation as shown in FIG. 8. In the first step, calculate the prediction error of point 4 and 2. If $E(2)<E(0)$ and $E(4)<E(0)$, check point 1 and select the point with the minimum prediction error among $E(1)$, $E(2)$ and $E(4)$. Then, go to the third step. The basis for this is that according to Fact 3, if $E(2)<E(0)$ and $E(4)<E(0)$, it is gathered that $E(7)>E(2)$, $E(5)>E(4)$, $E(8)>=E(0)$, thus points 5, 7 and 8 are able to be skipped. Also, according to Fact 5, $P(E(3)>E(1))>P(E(3)<E(1))$ and $P(E(6)>E(1))>P(E(6)<E(1))$ are obtainable. Thus, point 1 is the most probable point to achieve smaller prediction error.

In the second step, calculate the prediction error of point 5. If $E(2)<E(0)$ and $E(5)>E(0)$ and $E(4)>E(0)$, point 2 is selected as the best match point. Then go to the third step. If $E(2)<E(0)$ and $E(5)<E(0)$, check point 3 and select the point with the minimum prediction error among E(2), E(3) and E(5). Then go to the third step. If E(2)>E(0), E(4)>E(0) and E(5)>E(0), check point 7 and select the point with the minimum prediction error between E(0) and E(7). Then go to the third step. If E(2)>E(0) and E(5)>E(4), check point 6 and select the point with the minimum prediction error between E(4) and E(6). Then, go to the third step. If E(2)>E(0) and E(5)<E(4), check point 8 and select the point with the minimum prediction error between E(4) and E(8). Then go to the third step.

In the third step, if the current search is in half-pixel, stop the half-pixel search and go to the quarter-pixel search. If the current search is in quarter-pixel, the selected motion vector is used as the final motion vector.

Figure 9:
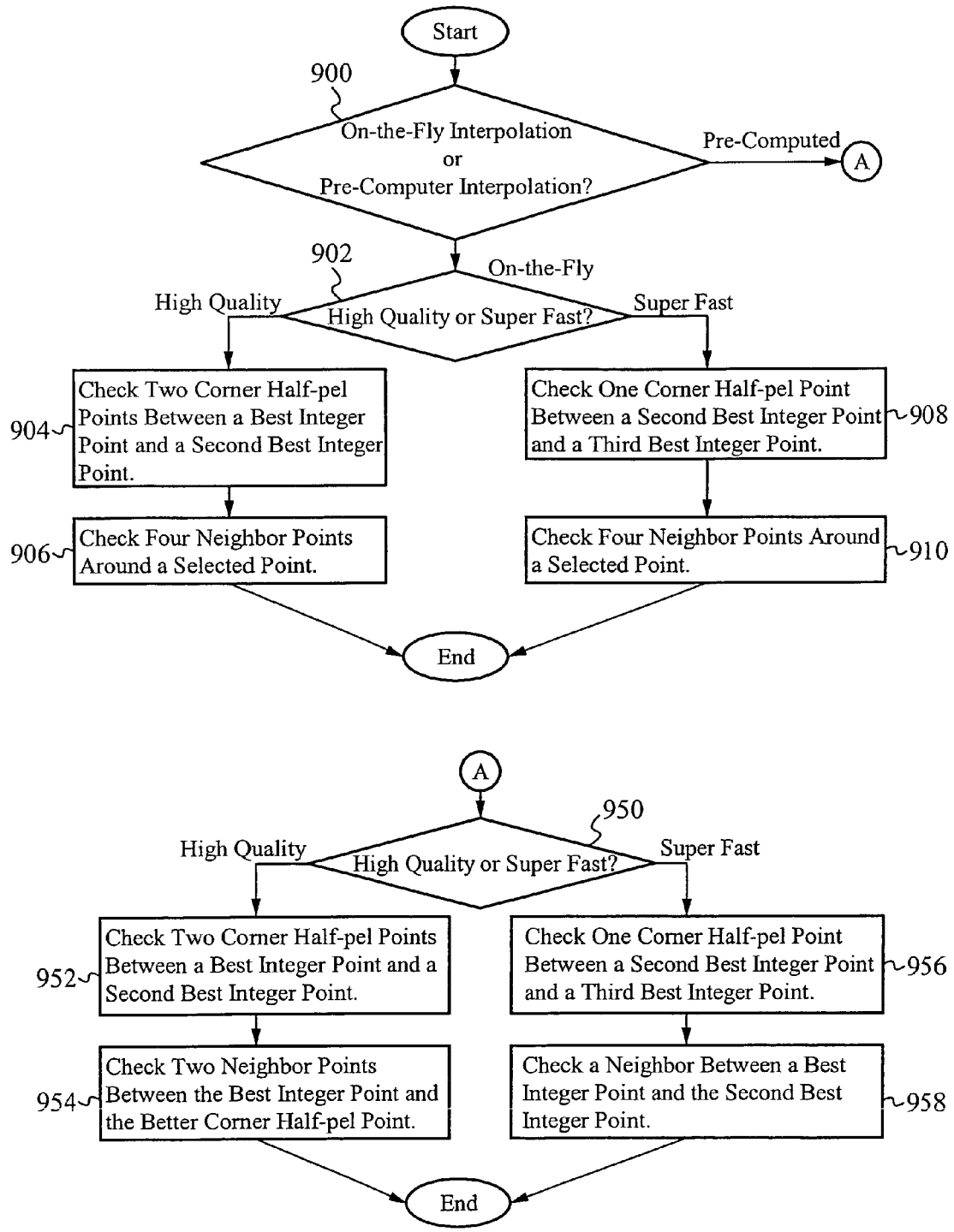
FIG. 9 illustrates a flowchart of half-pel motion estimation by different interpolation schemes.

FIG. 9 illustrates a flowchart of half-pel motion estimation by different interpolation schemes. In the step 900, either on-the-fly interpolation or pre-computed interpolation is chosen. In other embodiments, the type of interpolation is already selected, such as a dedicated on-the-fly interpolation. If on-the-fly interpolation is selected, the next decision is whether the primary focus is high quality or super fast speed, in the step 902. If high quality is selected, then in the step 904, check two corner half-pel points between a best integer point and a second best integer point. Then in the step 906, check four neighbor points around a selected point. If instead, super fast speed is selected, in the step 908, check one corner half-pel point between a second best integer point and a third best integer point. Then in the step 910, check four neighbor points around a selected point.

If pre-computed interpolation is selected, then again it must be determined which is the highest objective, either high quality or super fast speed, in the step 950. If high quality is selected, then in the step 952 check two corner half-pel points between a best integer point and a second best integer point. Then in the step 954, check two neighbor points between the best integer point and the better corner half-pel point. If super fast speed is selected, then in the step 956, check one corner half-pel point between a second best integer point and a third best integer point. Then in the step 958, check a neighbor between a best integer point and the second best integer point.

Figure 10A:
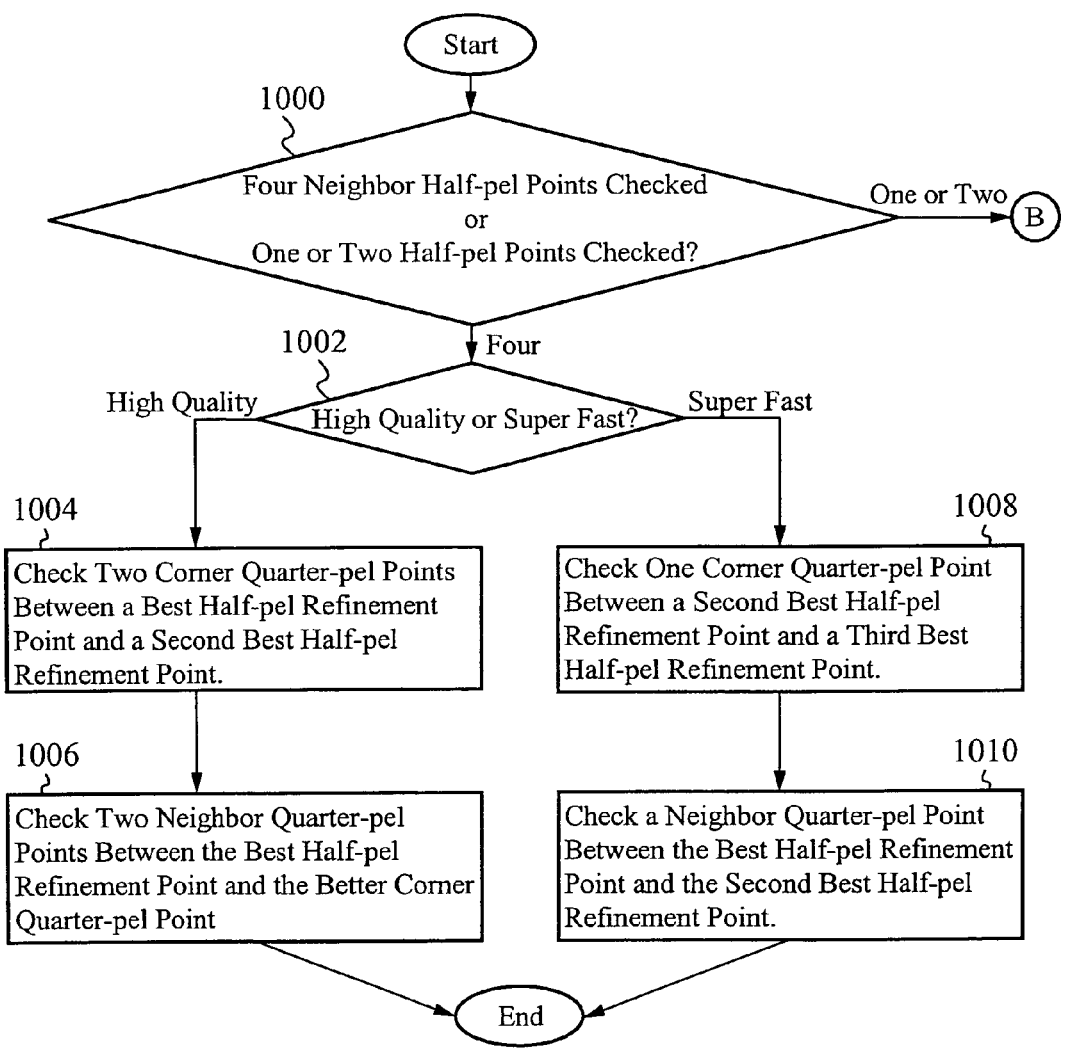
FIGS. 10A-B illustrate a flowchart of quarter-pel motion estimation by different interpolation schemes.
Figure 10B:
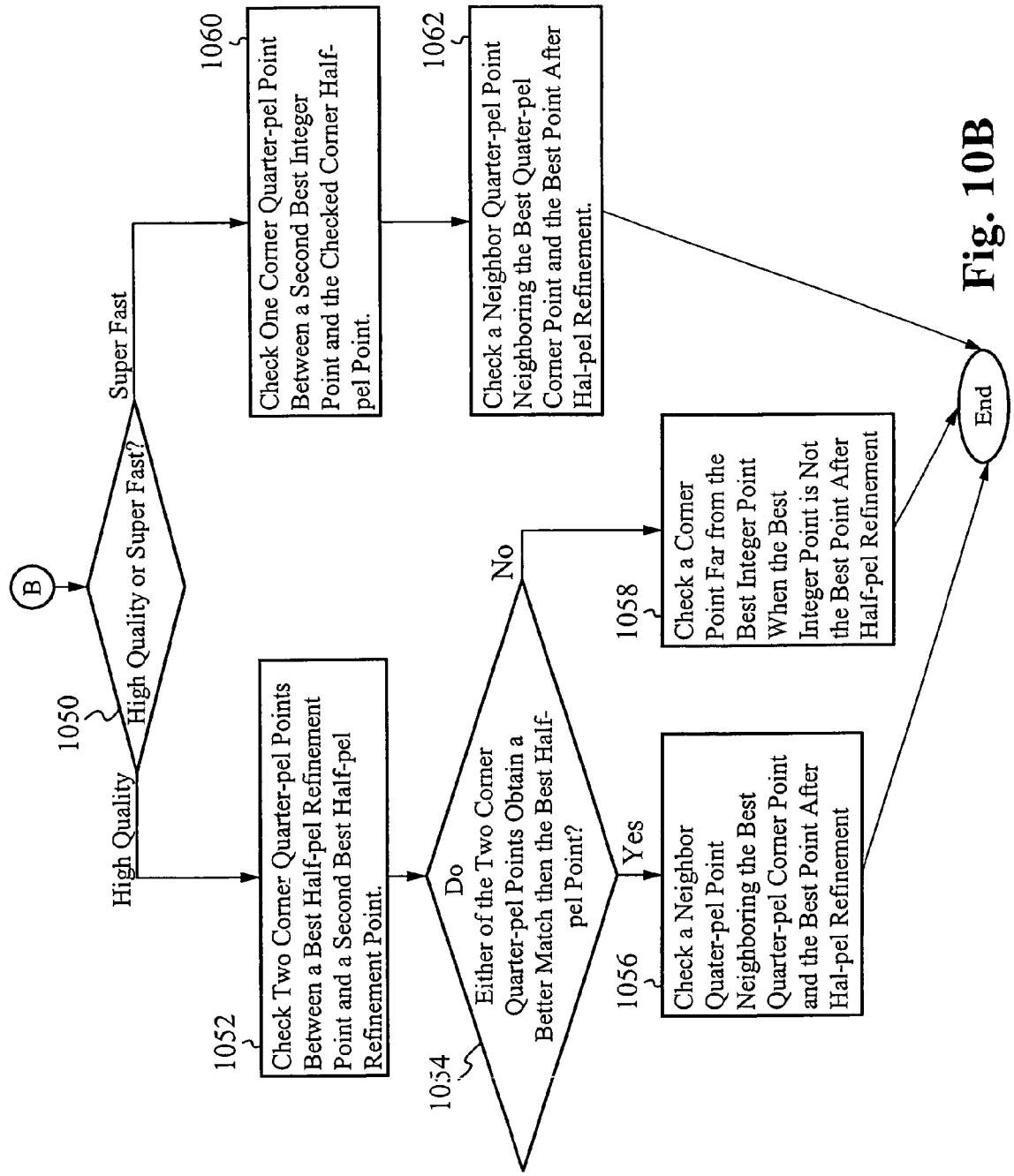

FIGS. 10A-B illustrate a flowchart of quarter-pel motion estimation by different interpolation schemes. In the step 1000, it is determined if four neighbor half-pel points are checked or one or two half-pel points. If four half-pel points are checked, then in the step 1002, the objective of high quality or super fast speed is selected. If high quality is selected, then in the step 1004, check two corner quarter-pel points between a best half-pel refinement point and a second best half-pel refinement point. In the step 1006, check two neighbor quarter-pel points between the best half-pel refinement point and the better corner point. If super fast speed is selected, then in the step 1008, check one corner quarter-pel point between a second best half-pel refinement point and a third best half-pel refinement point. Then in the step 1010, check a neighbor quarter-pel point between the best half-pel refinement point and the second best half-pel refinement point.

If one or two half-pel points are checked then, in the step 1050, either high quality or super fast speed is selected. If high quality is selected, then in the step 1052, check two corner quarter-pel points between a best half-pel refinement point and a second best half-pel refinement point. In the step 1054, it is determined if either of the two corner quarter-pel points obtain a better match than the best half-pel point. If they do, then the method jumps to the step 1056 to check a neighbor quarter-pel point neighboring the best quarter-pel corner point and the best point after half-pel refinement. If not, then the method continues to the step 1058 to check a corner point far from the best integer point when the best integer point is not the best point after half-pel refinement. If super fast speed is selected, then in the step 1060, check one corner quarter-pel point between a second best integer point and the checked corner half-pel point. Then, in the step 1062, check a neighbor quarter-pel point neighboring the best quarter-pel corner point and the best point after half-pel refinement. Utilizing these methods, the proper estimated motion vector is determined with high efficiency.

The method described herein is utilized to improve motion estimation within a video encoder. In an embodiment, a diamond based refinement is implemented. Within the diamond based refinement are half-pel refinement and quarter-pel refinement. Furthermore, within the half-pel refinement are methods for on-the-fly interpolation and pre-computed interpolation. On-the-fly has the advantage of using less memory, and pre-computed interpolation is faster. Within quarter-pel refinement, the method depends on whether four neighbor half-pel points or just one or two half-pel points are checked. Moreover, within each of the different embodiments is the ability to focus on quality or speed wherein different methods are implemented to maximize the desired function. When quality is the focus, more checks are required to achieve the best refinement; however, when speed is the main objective fewer checks are needed and quality is slightly affected. In another embodiment, a square based refinement is implemented. All of the embodiments utilize the concept of a uni-modal surface such that there is only one global minimum near the integer point, thus allowing certain points to be skipped as they are presumed to be larger than other points and thus not the best point.

In operation, the method of improving motion estimation within a video encoder is able to avoid checking points including half-pel points and quarter-pel points where it is highly unlikely they correspond to the correct motion vector. A device implementing the method described herein is able to more efficiently estimate the proper motion vector using a uni-modal surface assumption such that there is only one global minimum near each best integer point. By applying the uni-modal assumption, points are able to be skipped as they would result in more than one minimum, thus violating the uni-modal assumption. The method applies to both half-pel points and quarter-pel points, thus significantly reducing the number of checks required to determine the proper estimated motion vector.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of motion estimation in a video encoder executed using a processor, comprising:
   a. utilizing sub-pel diamond refinement; and
   b. applying uni-modal assumptions to determine which sub-pel points are checked within the sub-pel diamond refinement.

2. The method as claimed in claim 1 wherein on-the-fly interpolation is implemented.

3. The method as claimed in claim 2 further comprising:
   a. checking two corner half-pel points between a best integer point and a second best integer point; and
   b. checking four neighbor points around a selected point.

4. The method as claimed in claim 2 further comprising:
a. checking one corner half-pel point between a second best integer point and a third best integer point; and
b. checking four neighbor points around a selected point.

5. The method as claimed in claim 1 wherein pre-computed interpolation is implemented.

6. The method as claimed in claim 5 further comprising:
a. checking two corner half-pel points between a best integer point and a second best integer point; and
b. checking two neighbor points between the best integer point and the better corner half-pel point.

7. The method as claimed in claim 5 further comprising:
a. checking one corner half-pel point between a second best integer point and a third best integer point; and
b. checking a neighbor between a best integer point and the second best integer point.

8. The method as claimed in claim 1 wherein the video encoder utilizes H.264 standard protocol.

9. The method as claimed in claim 1 wherein the sub-pel refinement is half-pel refinement.

10. The method as claimed in claim 1 wherein the sub-pel refinement is quarter-pel refinement.

11. The method as claimed in claim 1 further comprising:
a. checking two corner quarter-pel points between a best half-pel refinement point and a second best half-pel refinement point; and
b. checking two neighbor quarter-pel points between the best half-pel refinement point and the better corner quarter-pel point,
where four neighbor half-pel points are checked.

12. The method as claimed in claim 1 further comprising:
a. checking one corner quarter-pel point between a second best half-pel refinement point and a third best half-pel refinement point; and
b. checking a neighbor quarter-pel point between the best half-pel refinement point and the second best half-pel refinement point,
where four neighbor half-pel points are checked.

13. The method as claimed in claim 1 further comprising:
a. checking two corner quarter-pel points between a best half-pel refinement point and a second best half-pel refinement point, wherein if either of the two corner quarter-pel points obtains a better match than the best half-pel go to step b, otherwise checking a corner point far from the best integer point when the best integer point is not the best point after half-pel refinement; and
b. checking a neighbor quarter-pel point neighboring the best quarter-pel corner point and the best point after half-pel refinement,
where one or two neighbor half-pel points are checked.

14. The method as claimed in claim 1 further comprising:
a. checking one corner quarter-pel point between a second best integer point and the checked corner half-pel point; and
b. checking a neighbor quarter-pel point neighboring the best quarter-pel corner point and the best point after half-pel refinement,
where one or two neighbor half-pel points are checked.

15. A method of sub-pel refinement for motion estimation in a video encoder executed using a processor, comprising:
a. determining a best integer point;
b. checking one or more corner points around the best integer point;
c. selecting a first point from the one or more corner points with the smallest prediction cost;
d. checking one or more neighbor points around the selected first point; and
e. selecting a second point with the smallest prediction cost of the one or more neighbor points.

16. The method as claimed in claim 15 wherein on-the-fly interpolation is implemented.

17. The method as claimed in claim 16 wherein checking one or more corner points comprises checking two corner half-pel points between a best integer point and a second best integer point.

18. The method as claimed in claim 17 wherein checking one or more neighbor points comprises checking four neighbor points around the selected first point.

19. The method as claimed in claim 16 wherein checking one or more corner points comprises checking one corner half-pel point between a second best integer point and a third best integer point.

20. The method as claimed in claim 19 wherein checking one or more neighbor points comprises checking four neighbor points around the selected first point.

21. The method as claimed in claim 15 wherein pre-computed interpolation is implemented.

22. The method as claimed in claim 21 wherein checking one or more corner points comprises checking two corner half-pel points between a best integer point and a second best integer point.

23. The method as claimed in claim 22 wherein checking one or more neighbor points comprises checking two neighbor points between the best integer point and the better corner half-pel point.

24. The method as claimed in claim 21 wherein checking one or more corner points comprises checking one corner half-pel point between a second best integer point and a third best integer point.

25. The method as claimed in claim 24 wherein checking one or more neighbor points comprises checking a neighbor between the best integer point and the second best integer point.

26. The method as claimed as claim 15 wherein the method is selected from the group consisting of diamond search based and square search based.

27. The method as claimed in claim 15 wherein the sub-pel refinement is half-pel refinement.

28. The method as claimed in claim 15 wherein the sub-pel refinement is quarter-pel refinement.

29. The method as claimed in claim 15 wherein checking one or more corner points comprises checking two corner quarter-pel points between a best half-pel refinement point and a second best half-pel refinement point.

30. The method as claimed in claim 29 wherein checking one or more neighbor points comprises checking two neighbor quarter-pel points between the best half-pel refinement point and the better corner quarter-pel point, where four neighbor half-pel points are checked.

31. The method as claimed in claim 15 wherein checking one or more corner points comprises checking one corner quarter-pel point between a second best half-pel refinement point and a third best half-pel refinement point.

32. The method as claimed in claim 31 wherein checking one or more neighbor points comprises checking a neighbor quarter-pel point between the best half-pel refinement point and the second best half-pel refinement point, where four neighbor half-pel points are checked.

33. The method as claimed in claim 15 wherein checking one or more corner points comprises checking two corner quarter-pel points between a best half-pel refinement point and a second best half-pel refinement point, wherein if either of the two corner quarter-pel points obtains a better match than the best half-pel, checking one or more neighbor points comprises checking a neighbor quarter-pel point neighboring the best quarter-pel corner point and the best point after half-pel refinement, where one or two neighbor half-pel points are checked, otherwise checking a corner point far from the best integer point when the best integer point is not the best point after half-pel refinement.

34. The method as claimed in claim 15 wherein checking one or more corner points comprises checking one corner quarter-pel point between a second best integer point and the checked corner half-pel point.

35. The method as claimed in claim 34 wherein checking one or more neighbor points comprises checking a neighbor quarter-pel point neighboring the best quarter-pel corner point and the best point after half-pel refinement, where one or two neighbor half-pel points are checked.

36. The method as claimed in claim 15 wherein the selected second point is utilized to determine a motion vector.

37. An apparatus comprising:
a. a program module for
 i. utilizing sub-pel diamond refinement; and
 ii. applying uni-modal assumptions to determine which sub-pel points are checked within the sub-pel diamond refinement; and
b. a processor for executing the program module.

38. An apparatus comprising:
a. a program module for
 i. checking one or more corner points around a best integer point;
 ii. selecting a first point from the one or more corner points with the smallest prediction cost;
 iii. checking one or more neighbor points around the selected first point; and
 iv. selecting a second point with the smallest prediction cost of the one or more neighbor points; and
b. a processor for executing the program module.

* * * * *